United States Patent [19]

Oda et al.

[11] Patent Number: 5,705,595
[45] Date of Patent: Jan. 6, 1998

[54] AQUEOUS INTERCOAT COMPOSITION

[75] Inventors: Hiroaki Oda; Mikio Shimakawa; Hisashi Isaka, all of Hiratsuka; Naoji Matsumoto, Kamakura, all of Japan

[73] Assignee: Kansai Paint Company, Limited, Amagasaki, Japan

[21] Appl. No.: 595,788

[22] Filed: Feb. 2, 1996

[30] Foreign Application Priority Data

Feb. 7, 1995 [JP] Japan ................................ 7-018983

[51] Int. Cl.$^6$ ................................ C08G 18/34
[52] U.S. Cl. ................................ 528/71; 528/45; 524/591; 525/440
[58] Field of Search ................ 528/45, 71; 524/591; 525/440

[56] References Cited

U.S. PATENT DOCUMENTS 4,501,829   2/1985   Oda et al. ........................ 523/400
4,968,536   11/1990  Goldner et al. .................. 427/388.4

Primary Examiner—Rachel Gorr
Attorney, Agent, or Firm—Armstrong, Westerman, Hattori, McLeland & Naughton

[57] ABSTRACT

This invention provides an aqueous intercoat composition comprising, as main components, (A) a polyester resin having a hydroxyl group and a carboxyl group in one molecule, (B) a blocked product of at least one polyisocyanate selected from a polymer of aliphatic polyisocyanate, an adduct of said polymer with an active hydrogen-containing compound and an adduct of aliphatic polyisocyanate with an active hydrogen-containing compound, and (C) water. The aqueous intercoat composition of the invention is capable of forming a coating film excellent in chipping resistance.

8 Claims, No Drawings

AQUEOUS INTERCOAT COMPOSITION

The present invention relates to a novel aqueous intercoat composition capable of forming a coating film excellent in resistance to chipping.

Automobiles running on a road flip pebbles on collision with them, and the flipped pebbles bump against automotive exterior panels, locally peeling off a coating film on the exterior panels. The so-called chipping is caused in this way. To prevent chipping of, e.g., a multi-layer coating film comprising a cationically electrodeposited primer coat, an intercoat and a top coat, it has been proposed to interpose what is called a chipping primer coat between the electrodeposited primer coat and the intercoat.

While this method contributes to improving the chipping resistance of coating film, it requires an additional coating step and is hence undesirable. Furthermore, the method may impair the finished film appearance.

It is an object of the present invention to provide a novel aqueous intercoat composition capable of forming a coating film excellent in chipping resistance.

Other objects and features of this invention will become apparent from the following description.

According to the present invention, there is provided an aqueous intercoat composition comprising, as main components, (A) a polyester resin having a hydroxyl group and a carboxyl group in one molecule, (B) a blocked product of at least one polyisocyanate selected from a polymer of aliphatic polyisocyanate, an adduct of said polymer with an active hydrogen-containing compound and an adduct of aliphatic polyisocyanate with an active hydrogen-containing compound, and (C) water.

The present inventor conducted extensive research and found that a multi-layer coating film composed of an electrodeposited primer coat, an intercoat and a top coat can be pronouncedly improved in chipping resistance without use of a chipping primer when an aqueous intercoat composition comprising a polyester resin and a specific blocked polyisocyanate is used. The present invention has been completed based on this novel finding.

The components of the aqueous intercoat composition according to the invention will be more specifically described below.

(A) Polyester resin

The polyester resin for use herein is a base resin of the aqueous intercoat composition according to the invention, and has a hydroxyl group and a carboxyl group in one molecule. It is preferred to use at least one polyester resin selected from the following three resins (A-1), (A-2) and (A-3).

Resin (A-1)

This polyester resin is prepared by subjecting a hydroxyl-containing polyester resin (A-1a) and an acid anhydride (A-1b) to half-esterification reaction to introduce a carboxyl group, the resin (A-1a) being prepared by reacting a dihydric or higher polyhydric alcohol with a divalent or higher polyvalent carboxylic acid.

Resin (A-2)

This polyester resin is prepared by reacting a hydroxyl- and carboxyl-containing polyester resin (A-2a) with a lactone (A-2b) to introduce a hydroxyl group at the end of the side chain, the resin (A-2a) being prepared by reacting a dihydric or higher polyhydric alcohol with a divalent or higher polyvalent carboxylic acid.

Resin (A-3)

This polyester resin is prepared by subjecting a polyester resin (A-3d) having at least two hydroxyl groups in one molecule and an acid anhydride (A-3e) to half-esterification reaction, the resin (A-3d) being prepared by reacting a dihydric or higher polyhydric alcohol (A-3a), a divalent or higher polyvalent carboxylic acid (A-3b) and a hydroxyl-containing resin (A-3c) selected from polyester resins, polyether resins, polycarbonate resins and polyurethane resins.

In the practice of the invention, it is preferred to use the resins (A-2) and (A-3) as the component (A) in view of markedly high chipping resistance and flexibility of cured film.

The resin (A-1) can be prepared by subjecting a hydroxyl-containing polyester resin (A-1a) and an acid anhydride (A-1b) to half-esterification reaction to introduce a carboxyl group, the resin (A-1a) being prepared by reacting a dihydric or higher polyhydric alcohol with a divalent or higher polyvalent carboxylic acid.

The polyhydric alcohol useful in preparing the resin (A-1a) is a compound having at least two hydroxyl groups in one molecule. Examples of the dihydric alcohol having two hydroxyl groups in one molecule are ethylene glycol, propylene glycol, diethylene glycol, dipropylene glycol, neopentyl glycol, butanediol, hexanediol, hydrogenated bisphenol A, propylene oxide adduct of bisphenol A, dibromoneopentyl glycol, allyl glycidyl ether, etc. Examples of the alcohol having at least three hydroxyl groups in one molecule are glycerin, trimethylolethane, trimethylolpropane, trishydroxymethylaminomethane, pentaerythritol, dipentaerythritol, etc. These polyhydric alcohols have a molecular weight of less than 500, preferably less than 300.

The polyvalent carboxylic acid useful in preparing the resin (A-1a) is a compound having at least two carboxyl groups in one molecule. Examples of the dicarboxylic acid having two carboxyl groups in one molecule are maleic acid, fumaric acid, itaconic acid, phthalic acid, isophthalic acid, terephthalic acid, tetrahydrophthalic acid, methyltetrahydrophthalic acid, endomethylenetetrahydrophthalic acid, adipic acid, sebasic acid, chlorendic acid, anhydrides of these acids, etc. Examples of the compound having at least three carboxyl groups in one molecule are trimellitic acid, pyromellitic acid, etc. These polyvalent carboxylic acids have a molecular weight of less than 500, preferably less than 300.

The hydroxyl-containing polyester resin (A-1a) can be prepared by esterifying said polyhydric alcohol with said polyvalent carboxylic acid under usual conditions. The resin (A-1a) contains at least two hydroxyl groups in one molecule and has a weight average molecular weight of about 5,000 to about 30,000, preferably about 10,000 to about 20,000 and a hydroxyl value of about 50 to about 200 mg KOH/g, preferably about 80 to about 150 mg KOH/g.

At least one species selected from said polyvalent carboxylic anhydrides useful in preparing the resin (A-1a) is useful as the acid anhydride (A-1b) which is reacted with some of hydroxyl groups of the resin (A-1a). The resin (A-1) can be prepared by effecting half-esterification reaction in the conventional manner to allow the acid anhydride (A-1b) to react with some of hydroxyl groups of the resin (A-1a), thereby introducing a carboxyl group.

The thus obtained polyester resin (A-1) has a weight average molecular weight of about 5,000 to about 30,000, preferably about 10,000 to about 20,000, a hydroxyl value of about 50 to about 200 mg KOH/g, preferably about 80 to about 150 mg KOH/g and an acid value of about 10 to about 50 mg KOH/g, preferably about 20 to about 40 mg KOH/g.

The polyester resin (A-2) can be prepared by reacting the hydroxyl group of the hydroxyl- and carboxyl-containing polyester resin (A-2a) with the lactone (A-2b) to introduce a hydroxyl group at the end of the side chain, the resin (A-2a) being prepared by reacting a dihydric or higher polyhydric alcohol with a divalent or higher polyvalent carboxylic acid.

The resin (A-2a) can be prepared by esterification reaction under usual conditions using the polyhydric alcohol and the polyvalent carboxylic acid selected from the examples given above for preparing the resin (A-1a). The resin (A-2a) contains at least two hydroxyl groups and at least two carboxyl groups in one molecule and has a weight average molecular weight of about 5,000 to about 30,000, preferably about 10,000 to about 20,000, and a hydroxyl value of about 50 to about 200 mg KOH/g, preferably about 80 to about 150 mg KOH/g.

The resin (A-2) can be prepared by reacting the lactone (A-2b) with the hydroxyl group of the resin (A-2a).

The lactone as the component (A-2b) is a cyclic compound having an ester linkage in the ring. Useful lactones include those having a 3- to 7-membered ring such as α-lactone, β-lactone, γ-lactone, δ-lactone, ε-lactone, etc. At least one species selected from these lactones is usable.

The resin (A-2a) and the compound (A-2b) are subjected to ring opening addition reaction to allow the compound (A-2b) to react with some or all of hydroxyl groups of the resin (A-2a), thereby producing a hydroxyl group at the end of the side chain formed from the compound (A-2b).

The thus obtained polyester resin (A-2) has a weight average molecular weight of about 5,000 to about 30,000, preferably about 10,000 to about 20,000, a hydroxyl value of about 50 to about 200 mg KOH/g, preferably about 80 to about 150 mg KOH/g and an acid value of about 10 to about 50 mg KOH/g, preferably about 20 to about 40 mg KOH/g.

The polyester resin (A-3) can be prepared by subjecting the polyester resin (A-3d) having at least two hydroxyl groups in one molecule and the acid anhydride (A-3e) to half-esterification reaction, the resin (A-3d) being prepared by reacting the dihydric or higher polyhydric alcohol (A-3a), the divalent or higher polyvalent carboxylic acid (A-3b) and the hydroxyl-containing resin (A-3c) selected from polyester resins, polyether resins, polycarbonate resins and polyurethane resins. The resin (A-3) has a hydroxyl group and a carboxyl group in one molecule.

The polyhydric alcohol (A-3a) and the polyvalent carboxylic acid (A-3b) useful in preparing the polyester resin (A-3) include the examples given hereinbefore as useful in preparing the resin (A-1a). The alcohol (A-3a) and the carboxylic acid (A-3b) have a molecular weight of less than 300, preferably less than 200.

The resin (A-3c) is a hydroxyl-containing resin selected from polyester resins, polyether resins, polycarbonate resins and polyurethane resins. Preferably these resins have hydroxyl groups only at both ends of the molecule. Preferred polyester resins include an ester of dihydric alcohol with dicarboxylic acid. Useful dihydric alcohols and dicarboxylic acids include those exemplified above. A polycaprolactone is also useful as the polyester resin. Useful polyether resins include polyethers prepared using at least one species selected from ethylene oxide, propylene oxide, butylene oxide, tetramethylene oxide and bisphenol. The polyurethane resin can be prepared by reacting a polyol such as said dihydric alcohol and polyesterdiol with a diisocyanate compound in a ratio which allows the presence of excess hydroxyl group. The resin (A-3c) has a weight average molecular weight of at least 300, preferably 500 to 2,000.

The polyester resin (A-3d) can be prepared by esterifying the components (A-3a), (A-3b) and (A-3c) in the conventional manner. The resin (A-3d) has a weight average molecular weight of about 5,000 to about 30,000, preferably about 10,000 to about 20,000, and a hydroxyl value of about 50 to about 200 mg KOH/g, preferably about 80 to about 150 mg KOH/g.

The resin (A-3) can be prepared by subjecting the polyester resin (A-3d) and the acid anhydride (A-3e) to half-esterification reaction to introduce a carboxyl group. The acid anhydride (A-3e) includes, for example, the acid anhydrides exemplified above as useful in preparing the resin (A-1). The half-esterification reaction can be conducted in the same manner as done in preparing the resin (A-1).

The thus obtained resin (A-3) has a weight average molecular weight of about 5,000 to about 30,000, preferably about 10,000 to about 20,000, a hydroxyl value of about 50 to about 200 mg KOH/g, preferably about 80 to about 150 mg KOH/g and an acid value of about 10 to about 50 mg KOH/g, preferably about 20 to about 40 mg KOH/g.

The component (A) for the aqueous intercoat composition of the invention is a polyester resin having a hydroxyl group and a carboxyl group in one molecule. Preferably the carboxyl group(s) of the resin is neutralized with a basic compound before the resin is dissolved or dispersed in water as the component (C).

Useful basic compounds are various and include, for example, hydroxides of alkali metals or alkaline earth metals such as sodium hydroxide, potassium hydroxide, lithium hydroxide, calcium hydroxide, barium hydroxide, etc.; primary monoamines such as ammonia, ethylamine, propylamine, butylamine, benzylamine, monoethanolamine, neopentanolamine, 2-aminopropanol, 3-aminopropanol, etc.; secondary monoamines such as diethylamine, diethanolamine, di-n- or iso-propanolamine, N-methylethanolamine, N-ethylethanolamine, etc.; tertiary amines such as dimethylethanolamine, trimethylamine, triethylamine, methyldiethanolamine, dimethylaminoethanol, etc.; and polyamines such as diethylenetriamine, hydroxyethylaminoethylamine, ethylaminoethylamine, etc.

The basic compound is reacted with some or all of carboxyl groups of the component (A) to effect neutralization, whereby the component (A) is made soluble or dispersible in water.

(B) Blocked polyisocyanate compound

The component (B) for use herein is a crosslinking agent for the aqueous intercoat composition of the invention, and is a blocked product of at least one polyisocyanate selected from (B-1) a polymer of aliphatic polyisocyanate, (B-2) an adduct of the polymer (B-1) with an active hydrogen-containing compound and (B-3) an adduct of aliphatic polyisocyanate with an active hydrogen-containing compound.

If other polyisocyanates, such as alicyclic or aromatic polyisocyanate compounds, than the foregoing polyisocyanates are used in the practice of the invention, a coating film of the resulting composition would not be satisfactory in chipping resistance, and the objects of the invention could not be achieved. Hence the use of other polyisocyanates is undesirable.

Aliphatic polyisocyanates useful for preparing the polymer of aliphatic polyisocyanate (B-1) are aliphatic compounds (excluding alicyclic compounds) having at least two isocyanate groups in one molecule. Examples of such aliphatic polyisocyanates are trimethylhexamethylene diisocyanate, dimer acid diisocyanate, hexamethylene diisocyanate, lysine diisocyanate, etc. which have 2 to 12 carbon atoms (as calculated by excluding the carbon atom in the isocyanate group). The polymer (B-1) for use in the invention includes those prepared by converting at least one aliphatic polyisocyanate selected from said compounds into dimers to pentamers by conventional methods.

The adduct (B-2) can be prepared by reacting an active hydrogen-containing compound with the free isocyanate groups of the polymer (B-1) and has at least two free isocyanate groups in the molecule.

The active hydrogen-containing compound is preferably a compound having at least two active hydrogen-containing groups such as a hydroxyl group, amino group, etc. in one molecule. Examples of such compounds are polyols such as trimethylolethane, trimethylolpropane, tris-(2-hydroxyethyl)isocyanurate, pentaerythritol, dipentaerythritol, sorbitol, glycerin, etc.; polyamines such as triethylenetetramine, tetraethylenepentamine, bis-(3-aminopropyl)ether, 1,2-bis-(3-aminopropoxy)ethane, 1,4-diaminobutane, iminobispropylamine, 1,3-bis-(3-aminopropoxy)-2,2-dimethylpropane, α-ω-bis-(3-aminopropyl)-polyethylene glycol ether, hexamethylenediamine, 2-methylpentamethylenediamine, iminobispropylamine, etc. Water can be used as such compound. The component (B-1) is reacted with the active hydrogen-containing compound under usual conditions. The obtained reaction product essentially has at least two free isocyanate groups in one molecule.

The adduct (B-3) is an adduct of aliphatic polyisocyanate with an active hydrogen-containing compound. The components for use in preparing the adduct (B-3) include those exemplified above as useful for preparing the polymer (B-1) and the adduct (B-2). The reaction for preparing the adduct (B-3) is effected under usual conditions. The obtained adduct (B-3) essentially has at least two free isocyanate groups.

Conventional blocking agents are usable in blocking the free isocyanate groups in the polymer (B-1) and the adducts (B-2) and (B-3). Useful blocking agents include, for example, alcohol-type, phenol-type, oxime-type amino-type, imide-type, amide-type, lactam-type, and dicarbonyl compound-type blocking agents, etc. These blocking agents block all or substantially all of free isocyanate groups of the system. When a coating of the intercoat composition of the invention is heated for curing to a specific temperature, the blocking agent is dissociated to regenerate isocyanate groups which are then reacted with hydroxyl groups of the component (A) to cause curing by crosslinking.

The aqueous intercoat composition of the present invention can be prepared by uniformly dissolving or dispersing the components (A) and (B) in water (component (C)). The proportions of the components (A) and (B) are properly selected according to the intended purpose, but are usually in the range wherein 0.5 to 1.5 moles, preferably 0.8 to 1.2 moles, of the blocked isocyanate group of the component (B) is present per mole of the hydroxyl group of the component (A). The method of dispersing the component (B) into water is not specifically limited.

A cured coating film of the aqueous intercoat composition according to the invention has a glass transition temperature of 0° to 70° C., preferably 30° to 50° C., as determined based on a coating film composed of components (A) and (B). The glass transition temperature of the cured coating film can be easily adjusted by varying the composition of the components (A) and (B), the ratio thereof or other factors.

The aqueous intercoat composition of the invention may optionally contain a curing catalyst, coloring pigment, extender pigment, surface modifier, popping inhibitor, etc. in addition to the components (A), (B) and (C). Examples of the curing catalyst are tin octoate, dibutyltin dilaurate, manganese, cobalt, lead, tin bismuthate, tin plumbate, zirconium octoate, zinc octoate, dibutyltin-bis-O-phenylphenylene, dibutyltin-S,S-dibutyldithio-carbonate, triphenylantimony dichloride, dibutyltin maleate, dibutyltin diacetate, dibutyltin dilaurate mercaptide, triethylenediamine, bismuth stearate, lead stearate, dimethyltin dichloride, etc. These curing catalysts can be used either alone or in combination. The amount of the catalyst used is 0.1 to 10 parts by weight per 100 parts by weight of the total solid weight of the components (A) and (B).

A coating film of the aqueous intercoat composition according to the invention is preferably laid between a primer coat such as a cationically electrodeposited coat and a top coat. Such primer coat and top coat include known coats. The three-layer coating film may be formed by any of 3-coat 1-bake system, 3-coat 2-bake system, and 3-coat 3-bake system. It is suitable to apply the aqueous intercoat composition of the invention to a thickness of about 5 to about 80 μm, preferably about 15 to about 35 μm when cured. A coating of aqueous intercoat composition of the invention is heated to higher than the dissociating temperature of the blocking agent of the component (B), whereby the coating is cured by crosslinking. Usually the coating of the composition is heated for curing to about 100° to about 200° C., preferably about 120° to about 160° C.

The present invention can achieve the following remarkable results.

(1) A multi-layer coating film consisting of a primer coat, the intercoat of the invention and a top coat is excellent in chipping resistance and eliminates the need for the chipping primer heretofore used.

(2) The coating process can be simplified because a chipping primer is not used.

(3) The top coat of the multi-layer coating film-including the intercoat of the invention is excellent in surface smoothness, distinctness-of-image gloss, gloss, etc.

The present invention will be described below in more detail with reference to Preparation Examples, Examples and Comparative Examples wherein the parts and percentages are all by weight.

(A) PREPARATION OF POLYESTER RESIN

Preparation Example 1

A reactor was charged with 348 parts of neopentyl glycol, 150 parts of trimethylolpropane, 128 parts of adipic acid and 435 parts of phthalic anhydride. The contents of the reactor were reacted at 220° C. for 5 hours. The reaction product was admixed with 42 parts of trimellitic anhydride and the mixture was reacted at 160° C. for 1 hour. Added to the reaction mixture were 88 parts of κ-caprolactone and 1 part of dodecylbenzenesulfonic acid. The mixture was reacted at 150° C. for 3 hours, giving a polyester resin (1) which had a weight average molecular weight of about 12,000, an acid value of 25 mg KOH/g, and a hydroxyl value of 110 mg KOH/g.

Preparation Example 2

A reactor was charged with 272 parts of neopentyl glycol, 136 parts of trimethylolpropane, 232 parts of adipic acid, 296 parts of phthalic anhydride and 240 parts of polyurethanediol (*1). The contents of the reactor were reacted at 220° C. for 5 hours. The obtained reaction product was admixed with 28 parts of trimellitic anhydride and the mixture was reacted at 160° C. for 1 hour, giving a polyester resin (2) which had a weight average molecular weight of about 10,000, an acid value of 25 mg KOH/g, and a hydroxyl value of 110 mg KOH/g. Note: (*1) polyurethanediol; a product of King Industry Co., Ltd., trade name "FLEX-OREZ UD-320-100" (number average molecular weight 1,000 to 1,500).

Example 1

An aqueous intercoat composition was prepared according to the invention by dispersing 1,000 parts of polyester resin (1) (based on solid content, same hereinafter), 40 parts of dimethylaminoethanol (*2), 410 parts of blocked aliphatic hexafunctional polyisocyanate compound (*3), 14 parts of tin catalyst (*4), 1,400 parts of titanium white pigment (*5) and 20 parts of carbon black (*6) in 1,800 parts of deionized water. Note: (*2) dimethylaminoethanol; product of Nihon Nyukazai Co., Ltd., trade name "Amino Alcohol 2 Mabs" (*3) blocked aliphatic hexafunctional polyisocyanate compound; a methylethyl ketoxime-blocked urethanization adduct of 3 moles of trimer of hexamethylene diisocyanate with 1 mole of trimethylolpropane (*4) tin catalyst; dibutyltin dilaurate (*5) titanium white pigment; "Tayca JR602", trade name, product of TAYCA CORPORATION (*6) Carbon black; product of Mitsubishi Chemical Co., Ltd. trade name "Mitsubishi Carbon Black M-100"

Example 2

An aqueous intercoat composition was prepared according to the invention by dispersing 1,000 parts of polyester resin (1), 40 parts of dimethylaminoethanol (*2), 410 parts of blocked aliphatic trifunctional polyisocyanate compound (*7), 14 parts of tin catalyst (*4), 1,400 parts of titanium white pigment (*5) and 20 parts of carbon black (*6) in 1,800 parts of deionized water. Note: (*7) blocked aliphatic trifunctional polyisocyanate compound; methylethyl ketoxime-blocked trimer of hexamethylene diisocyanate, product of Takeda Chemical Industries Ltd., trade name "TAKENATE WB-720"

Example 3

An aqueous intercoat composition was prepared according to the invention by dispersing 1,000 parts of polyester resin (2), 40 parts of dimethylaminoethanol (*2), 410 parts of blocked aliphatic hexafunctional polyisocyanate compound (*3), 14 parts of tin catalyst (*4), 1,400 parts of titanium white pigment (*5) and 20 parts of carbon black (*6) in 1,800 parts of deionized water.

Example 4

An aqueous intercoat composition was prepared according to the invention by dispersing 1,000 parts of polyester resin (2), 40 parts of dimethylaminoethanol (*2), 410 parts of blocked aliphatic trifunctional polyisocyanate compound (*7), 14 parts of tin catalyst (*4), 1,400 parts of titanium white pigment (*5) and 20 parts of carbon black (*6) in 1,800 parts of deionized water.

Comparative Example 1

A comparative aqueous intercoat composition was prepared by dispersing 1,000 parts of polyester resin (1), 40 parts of dimethylaminoethanol (*2), 300 parts of melamine resin (*8), 1,400 parts of titanium white pigment (*5) and 20 parts of carbon black (*6) in 1,800 parts of deionized water. Note: (*8) melamine resin; product of Mitsui-cyanamide, Ltd., trade name "Cymel 303", methanol-modified melamine resin

Comparative Example 2

A comparative aqueous intercoat composition was prepared by dispersing 1,000 parts of polyester resin (2), 40 parts of dimethylaminoethanol (*2), 410 parts of blocked aromatic trifunctional polyisocyanate compound (*9), 14 parts of tin catalyst (*4), 1,400 parts of titanium white pigment (*5) and 20 parts of carbon black (*6) in 1,800 parts of deionized water. Note: (*9) blocked aromatic trifunctional polyisocyanate compound; methylethyl ketoxime-blocked trimer of tetramethylxylylene diisocyanate, product of Takeda Chemical Industries, Ltd., trade name "TAKENATE WB-770"

The intercoat compositions prepared in the Examples and Comparative Examples were evaluated in properties by the following methods.

A cationically electrodepositable epoxy resin coating composition ("ELECRON #9800", product of Kansai Paint Co., Ltd.) was applied to a dull steel panel (surface-treated with zinc sulfate) to form a primer coat having a thickness of 25 μm when cured (the same hereinafter). The coated panel was heated for curing to 170° C. for 30 minutes. Then each of intercoat compositions prepared in the Examples and Comparative Examples was applied to the primer coat by spray coating to give an intercoat 30 to 35 μm in thickness. The coated panel was heated for curing at 140° C. for 30 minutes. A top coat composition ("Amilac White", trade name, product of Kansai Paint Co., Ltd.) was applied to the intercoat by spray coating to give a top coat 40 μm in thickness. The coated panel was heated for curing at 140° C. for 30 minutes, whereby a multi-layer coating film composed of the electrodeposited primer coat, intercoat and top coat was formed.

The multi-layer coating films thus formed were evaluated in properties by the following methods.

Test methods

Distinctness-of-image gloss: This characteristic was measured by Image Clarity Meter (tester manufactured by Suga Tester Co., Ltd.). The results are shown in Table 1. The measurement values (ICM values) are in the range of 0 to 100. The greater the figure is, the better the distinctness-of-image gloss is. The ICM value of more than 80 means a high degree of distinctness-of-image gloss exhibited by the coating film.

Chipping resistance

Crushed stone fragments (100 g) 15 to 20 mm in diameter was forced out by a spray against the coated panel at an angle of 90° under an air pressure of about 4 kg/cm$^2$ with the coating surface at −20° C. using Q-G-R gravelometer (manufactured by Q Panel Co., Ltd.). Thereafter the coated panel was evaluated in the condition of coating surface and a salt spray resistance.

The condition of coating surface (appearance) was visually inspected and evaluated on the A–C scale:

A: The top coat was slightly marred but no peel occurred in the primer coat.

B: The top coat and the intercoat were marred and the primer coat was slightly peeled.

C: The top coat and the intercoat were markedly marred and the primer coat was pronouncedly peeled.

A salt spray test was carried out by exposing the coated panel to salt spray for 960 hours according to JIS Z2371. Thereafter cellophane tape was fixed to the coating surface and forcibly peeled off. Then, the tape-removed area was inspected for occurrence of corrosion. The results were evaluated on the A–C scale.

A: Substantially no corrosion occurred.

B: A little corrosion occurred.

C: Considerable degree of corrosion occurred.

Impact resistance

The coated panel was tested with a Du Pont impact tester using a weight of 500 g with a tip 0.5 inch in radius. The test was conducted to determine the maximum height (5 cm calibration) at which no cracking was caused by dropping the weight onto the coated panel.

Moisture resistance

The coated panel was left to stand at 50° C. and RH 95% for 72 hours. Thereafter the coated panel was visually evaluated in the appearance and adhesion.

The appearance was rated on the A–C scale.

A: No change.

B: Slight blistering and flaking were detected.

C: Considerable degrees of blistering and flaking were found.

The adhesion was evaluated by tape test. The coating surface was crosswise cut to the substrate to produce 100 squares, each 1 mm×1 mm. Cellophane tape was fixed to the coating surface and forcibly peeled off. The adhesion was rated on the A–C scale.

A: The coating film remained in more than 90 squares.

B: The coating film remained in 70 to 90 squares.

C: The coating film remained in less than 70 squares.

The test results are shown below in Table 1.

TABLE 1

|  |  | Example | | | | Comparative Example | |
|---|---|---|---|---|---|---|---|
|  |  | 1 | 2 | 3 | 4 | 1 | 2 |
| Gloss (60° specular gloss) | | 93 | 94 | 93 | 93 | 94 | 94 |
| Distinctness-of-image gloss | | 84 | 85 | 85 | 86 | 75 | 74 |
| Chipping resistance | Appearance | A | A | A | A | C | B |
|  | Resistance to salt spray | A | A | A | A | C | B |
| Impact resistance | | 50< | 50< | 50< | 50< | 30 | 40 |
| Moisture resistance | Appearance | A | A | A | A | A | A |
|  | Adhesion | A | A | A | A | A | A |

What we claim is:

1. An aqueous intercoat composition comprising, as main components, (A) a polyester resin having a weight average molecular weight of about 10,000 to about 20,000 and containing a hydroxyl group and a carboxyl group in one molecule, (B) a blocked product of at least one polyisocyanate selected from the group consisting of dimers to pentamers of aliphatic polyisocyanate, an adduct of said dimers to pentamers with an active hydrogen-containing compound and an adduct of aliphatic polyisocyanate with an active hydrogen-containing compound, and (C) water.

2. The aqueous intercoat composition according to claim 1 wherein the polyester resin (A) is at least one species selected from the group consisting of polyester resins prepared by reacting a hydroxyl- and carboxyl-containing polyester resin with a lactone and polyester resins prepared by subjecting a polyester resin having at least two hydroxyl groups in one molecule and an acid anhydride to half-esterification reaction.

3. The aqueous intercoat composition according to claim 1 wherein the polyester resin (A) has a hydroxyl value of about 50 to about 200 mg KOH/g, and an acid value of about 10 to about 50 mg KOH/g.

4. The aqueous intercoat composition according to claim 3 wherein the polyester resin (A) has a hydroxyl value of about 80 to about 150 mg KOH/g, and an acid value of about 20 to about 40 mg KOH/g.

5. The aqueous intercoat composition according to claim 1 wherein components (A) and (B) are present in proportions such that a composition containing only components (A) and (B) in such proportions gives upon curing a film coating having a glass transition temperature of 0° to 70° C.

6. The aqueous intercoat composition according to claim 5 wherein components (A) and (B) are present in proportions such that a composition containing only components (A) and (B) in such proportions gives upon curing a film coating having a glass transition temperature of 30° to 50° C.

7. The aqueous intercoat composition according to claim 1 wherein the proportions of the components (A) and (B) are in the range in which 0.5 to 1.5 moles of the blocked isocyanate group of the component (B) is present per mole of the hydroxyl group of the component (A).

8. The aqueous intercoat composition according to claim 7 wherein the proportions of the components (A) and (B) are in the range in which 0.8 to 1.2 moles of the blocked isocyanate group of the component (B) is present per mole of the hydroxyl group of the component (A).

* * * * *